(12) United States Patent
Chen

(10) Patent No.: US 11,253,874 B2
(45) Date of Patent: Feb. 22, 2022

(54) CYCLONIC DUST FILTER DEVICE

(71) Applicant: X'POLE PRECISION TOOLS INC., Taoyuan (TW)

(72) Inventor: Bach Pangho Chen, Claremont, CA (US)

(73) Assignee: X'POLE PRECISION TOOLS INC., Taoyuan (TW)

( * ) Notice: Subject to any disclaimer, the term of this patent is extended or adjusted under 35 U.S.C. 154(b) by 81 days.

(21) Appl. No.: 16/575,995

(22) Filed: Sep. 19, 2019

(65) Prior Publication Data
US 2021/0086201 A1    Mar. 25, 2021

(51) Int. Cl.
| | |
|---|---|
| A47L 5/36 | (2006.01) |
| B04C 5/103 | (2006.01) |
| B01D 45/16 | (2006.01) |
| B01D 45/12 | (2006.01) |
| A47L 9/16 | (2006.01) |
| B04C 9/00 | (2006.01) |
| A47L 9/12 | (2006.01) |
| B01D 46/00 | (2022.01) |

(52) U.S. Cl.
CPC .............. *B04C 5/103* (2013.01); *B01D 45/12* (2013.01); *B01D 45/16* (2013.01); *A47L 9/127* (2013.01); *A47L 9/1666* (2013.01); *A47L 9/1683* (2013.01); *B01D 46/0068* (2013.01); *B04C 2009/002* (2013.01)

(58) Field of Classification Search
CPC ... B04C 5/103; B04C 2009/002; B01D 45/16; B01D 45/12; B01D 46/0068; A47L 9/1666; A47L 9/127; A47L 9/1683
See application file for complete search history.

(56) References Cited

U.S. PATENT DOCUMENTS

| | | |
|---|---|---|
| 6,833,016 B2 | 12/2004 | Witter |
| 7,247,180 B1 | 7/2007 | Hill |
| 8,161,597 B2 | 4/2012 | Witter et al. |
| 8,514,090 B2 | 8/2013 | Witter et al. |
| 9,125,535 B2 | 9/2015 | Witter et al. |
| 9,468,348 B2 | 10/2016 | Chen |
| 2007/0095028 A1* | 5/2007 | Kim ...................... A47L 9/1641 55/337 |
| 2008/0028940 A1* | 2/2008 | Han ......................... B04C 9/00 96/417 |

(Continued)

*Primary Examiner* — Dung H Bui
(74) *Attorney, Agent, or Firm* — Muncy, Geissler, Olds & Lowe, P.C.

(57) ABSTRACT

A cyclonic dust filter device comprises a trunk, at least one first retaining wall, and at least one second retaining wall. The trunk comprises a channel, an air inlet end and an air outlet end disposed at two ends of the channel, and a dust filter hole communicating with the channel. The first and second retaining walls are respectively disposed correspondingly to the dust filter hole. When a dust-containing airflow to-be-filtered enters the channel from the air inlet end, the dust-containing airflow forms a centrifugal airflow that contains the dust and is thrown out of the channel at a position of the dust filter hole. The first and second retaining walls are respectively disposed on a traveling path of the centrifugal airflow, so that the centrifugal airflow sequentially strikes the first and second retaining walls to change the traveling direction and then discharges dust free clean air.

9 Claims, 10 Drawing Sheets

(56) References Cited

U.S. PATENT DOCUMENTS

| | | | |
|---|---|---|---|
| 2009/0031680 A1* | 2/2009 | Hyun | B01D 45/16 55/345 |
| 2010/0043365 A1* | 2/2010 | Fujiyama | B01D 45/12 55/426 |
| 2012/0285322 A1* | 11/2012 | Halpap | B04C 5/04 95/271 |
| 2014/0033921 A1* | 2/2014 | Peck | B01D 45/08 95/269 |
| 2014/0102300 A1* | 4/2014 | Ray, Jr. | F01N 1/08 95/272 |
| 2015/0128544 A1* | 5/2015 | Roston | B01D 45/14 55/471 |
| 2015/0174508 A1* | 6/2015 | Bozic | B01D 46/2411 210/188 |
| 2018/0056464 A1 | 3/2018 | Witter et al. | |
| 2018/0229586 A1* | 8/2018 | Army | B60H 3/0658 |
| 2018/0272264 A1* | 9/2018 | Ming | B01D 47/025 |
| 2018/0353888 A1* | 12/2018 | Nie | B04C 3/06 |
| 2019/0134649 A1 | 5/2019 | Witter et al. | |
| 2019/0275452 A1* | 9/2019 | Cheng | B01D 45/06 |
| 2019/0277227 A1* | 9/2019 | Larson | B01D 46/48 |
| 2019/0321834 A1* | 10/2019 | Chen | B04C 5/04 |
| 2020/0122199 A1* | 4/2020 | Araos Almendras | B04C 5/081 |
| 2020/0164296 A1* | 5/2020 | Cho | C23C 16/4412 |
| 2020/0179850 A1* | 6/2020 | Barger | B01D 45/16 |
| 2020/0376501 A1* | 12/2020 | Herman | F16K 15/026 |

* cited by examiner

CYCLONIC DUST FILTER DEVICE

FIELD OF THE INVENTION

The present invention relates to a cyclonic dust filter device, and more particularly to a cyclonic dust filter device which is assembled in a dust filter equipment and capable of causing an airflow to-be-filtered completed with a primary dust filtering to form a centrifugal cyclone which can be performed with a secondary dust filtering.

BACKGROUND OF THE INVENTION

The cyclone separation actually belongs to a type of centrifugal sedimentation. Particles are rotated in a vortex flow at a high speed by centrifugal force. When the rotation speed is increased, the centrifugal sedimentation speed obtained by the particles is increased, thereby achieving the object of separating the particles from the airflow.

Conventional cyclonic dust filter equipment is provided in, for example, U.S. Pat. Nos. 6,833,016, 7,247,180, 8,161, 597, 8,514,090, 9,125,535, US 2,018,056,464 and US 2,019, 134,649. After an external air to be filtered is sucked by the conventional dust filter equipment, the external air to be filtered generates a descending cyclone in the conventional dust filter equipment, and suction of the conventional dust filter equipment is used to convert the descending airflow into an ascending airflow. Dust in the external air to be filtered is unable to rise with the ascending airflow due to weight of the dust, and sinks to a bottom of the conventional dust filter equipment to achieve the object of dust filtering.

However, it can be known from the prior patents that the conventional dust filter equipment can only filter dust by a single ascending airflow and are unable to perform multiple dust filtering. Once the cyclonic centrifugal force generated by the conventional dust filter structures is insufficient or the particles of the dust are small, the conventional dust filter equipment is unable to provide cleaner air. Although cyclone separation technology has been successfully applied to household dust suction devices in recent years, household dust suction devices only need to collect a small amount of dust particles, so that the simple structure of the cyclone separator with small volume can be used since the requirements for dust filter effect are low compared with the industrial requirements. Thus, if the same simple structure of the cyclone separator with small volume is applied to the industrial implementation, its dust filter effect obviously does not meet the requirements of the industrial application.

In addition, the applicant of the present invention has also proposed similar patented technologies of dust filter equipment, such as the technologies disclosed in U.S. Ser. No. 15/960,121, U.S. Pat. No. 9,468,348.

SUMMARY OF THE INVENTION

A main object of the present invention is to improve the dust filter efficiency of dust collection by the multi-cyclonic dust filter equipment and to simplify the dust filter equipment.

In order to achieve the above object, the present invention provides a cyclonic dust filter device comprising a trunk, at least one first retaining wall, and at least one second retaining wall. The trunk comprises a hollow flow channel, as well as an air inlet end and an air outlet end respectively located at two ends of the hollow flow channel. The trunk is provided with at least one dust filter hole communicating with the hollow flow channel, the trunk provides an airflow to-be-filtered which contains a dust to enter the hollow flow channel from the air inlet end and discharges from the air outlet end, and the airflow to-be-filtered forms a centrifugal airflow that contains the dust at a position of the dust filter hole and is discharged outside of the trunk. Moreover, the first retaining wall is located on a traveling path of the centrifugal airflow, and a first impact zone is defined by the at least one first retaining wall for the centrifugal airflow striking to the first retaining wall and changing a direction of the centrifugal airflow to form a first deflecting airflow. Furthermore, the second retaining wall is located on a traveling path of the first deflecting airflow, and a second impact zone is defined by the second retaining wall for the first deflecting airflow striking to the second retaining wall and changing a direction of the first deflecting airflow to form at least one second deflecting airflow.

In an embodiment, the dust filter hole is disposed at a position of an end edge of the air outlet end.

In an embodiment, the first retaining wall is formed by extending outwardly from the end edge of the air outlet end of the trunk.

In an embodiment, the second retaining wall is formed by extending outwardly from a position of the trunk corresponding to a hole edge of one side of the dust filter hole.

In an embodiment, the trunk is provided with a deflector hood at a remaining section from the dust filter hole to the air inlet end, and a diameter of the deflector hood is larger than a diameter of the trunk.

In an embodiment, a cover is disposed between the deflector hood and the trunk, and the cover comprises a through hole corresponding to the air inlet end.

In an embodiment, an outer side surface of the deflector hood is a guiding arcuate surface.

In an embodiment, the deflector hood is provided with a fixing bracket.

In an embodiment, a diameter of the hollow flow channel is tapered from the air inlet end to the air outlet end.

According to the foregoing disclosure, the present invention has the following features compared with the prior art, the cyclonic dust filter device of the present invention is provided with the first retaining wall, the second retaining wall and the dust filter hole, so that after the airflow to-be-filtered enters the hollow flow channel and passes through the position of the dust filter hole, the airflow to-be-filtered sequentially strikes the first impact zone and the second impact zone, thereby enabling the cyclonic dust filter device to filter for the airflow to-be-filtered. When the present invention is installed in a dust filter equipment, the dust filter equipment is capable of providing cleaner air through the cyclonic dust filter device of the present invention in addition to filtering dust by the conventional dust filter method.

DETAILED DESCRIPTION OF THE PREFERRED EMBODIMENTS

The detailed description and technical contents of the present invention are described below with reference to the drawings.

Figure 1:
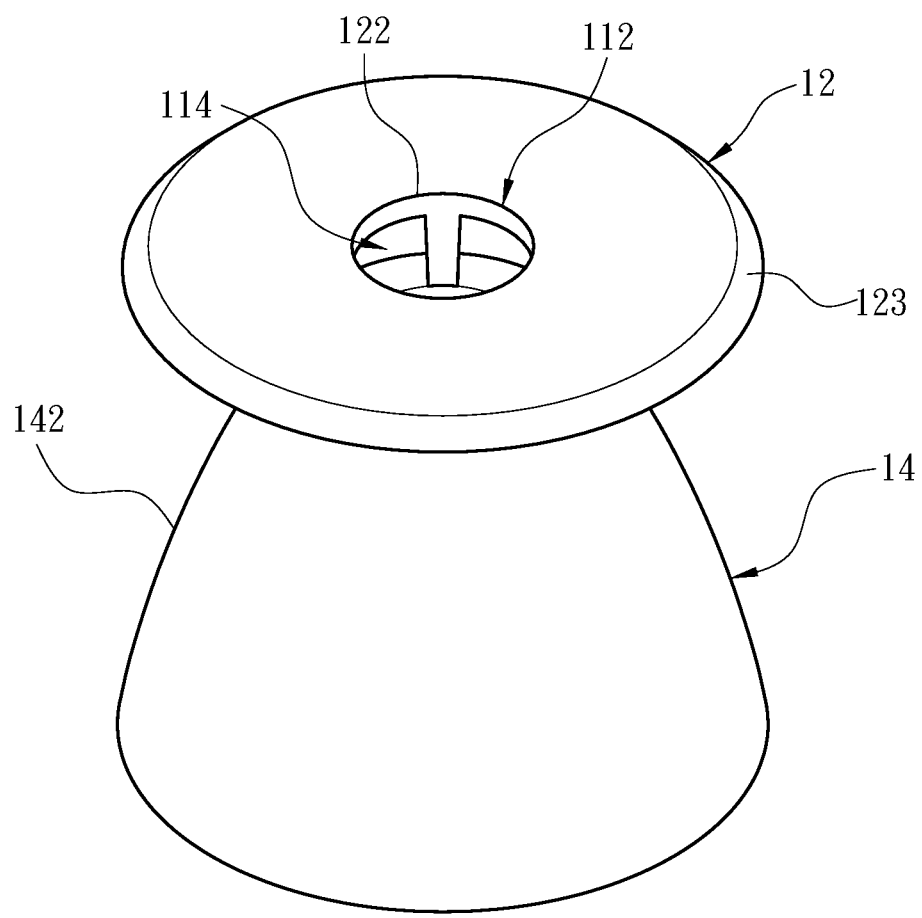
FIG. 1 is a perspective view of the structure of an embodiment of a cyclonic dust filter device of the present invention.
Figure 2:
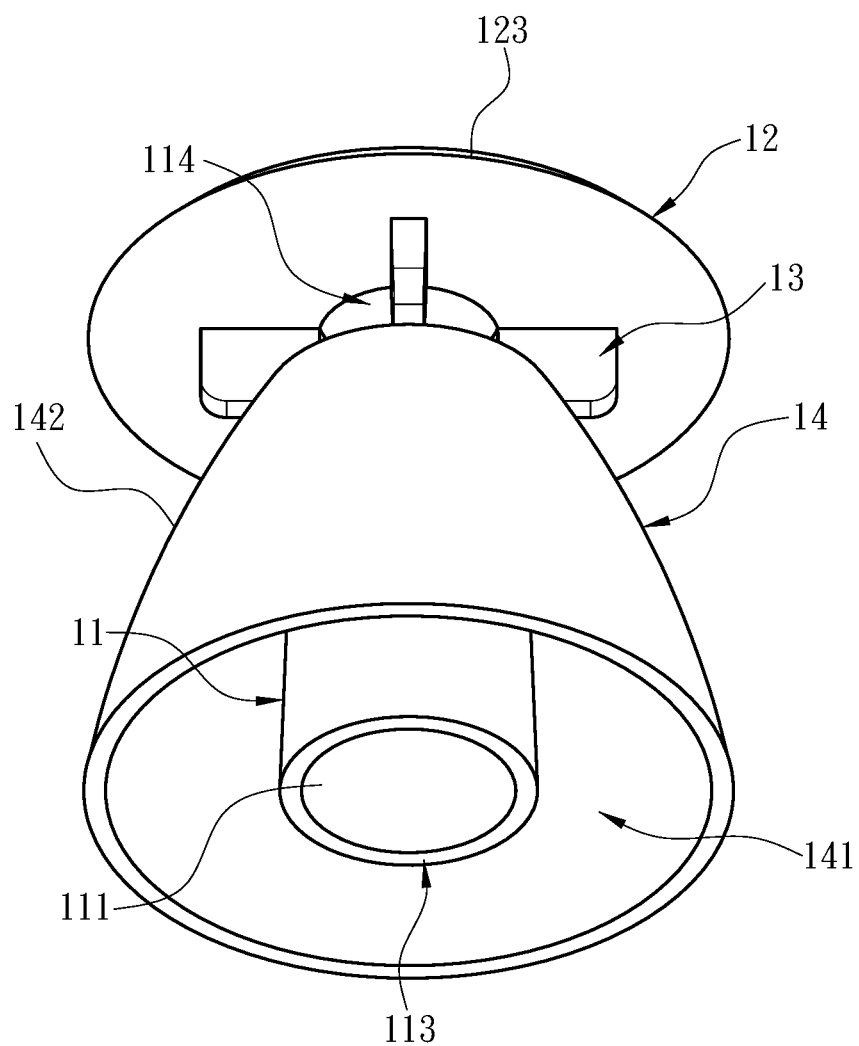
FIG. 2 is a perspective view of the structure of an embodiment of the cyclonic dust filter device of the present invention viewed from another angle.

In the following, the terms "first" and "second" used in elements are intended to distinguish the elements and are not intended to limit the order of the elements. In addition, the following spatial relative terms such as "top end", "bottom edge", "upward" and "downward" are based on the directions in which the figures are drawn. It is understandable that these spatial relative terms can be changed as the directions in which the figures are drawn are change, for example, once the FIG. 1 is turned to be horizontal, the original "top end" and "bottom edge" will be changed to "left" and "right" respectively.

Please refer to FIG. 1, FIG. 2, FIG. 3A, FIG. 3B, and FIG. 3C, the present invention provides a cyclonic dust filter device 10 comprising a trunk 11, at least one first retaining wall 12 and at least one second retaining wall 13. The trunk 11 comprises a hollow flow channel 111, an air outlet end 112 disposed at one end of the hollow flow channel 111, an air inlet end 113 disposed at one end of the hollow flow channel 111 without the air outlet end 112, and at least one dust filter hole 114 communicating with the hollow flow channel 111. For example, the hollow flow channel 111 is configured to be a cylindrical shape, and the air outlet end 112 and the air inlet end 113 are respectively located at two ends of the hollow flow channel 111, that is, when the air inlet end 113 is disposed at a bottom of the hollow flow channel 111, the air outlet end 112 is disposed at a top end of the hollow flow channel 111. In an embodiment, the dust filter hole 114 is disposed at a position of an end edge of the hollow flow channel 111 corresponding to the air outlet end 112. On the other hand, shapes and forms of the first retaining wall 12 and the second retaining wall 13 are illustrated. The first retaining wall 12 is disposed at one side of the trunk 11 where the air outlet end 112 is disposed, and an extending direction of the first retaining wall 12 is orthogonal to the hollow flow channel 111 so that one side of the first retaining wall 12 faces to the dust filter hole 114. The second retaining wall 13 is also connected to the side of the trunk 11 disposed with the air outlet end 112, and the second retaining wall 13 is disposed between the trunk 11 and the first retaining wall 12. Moreover, an extending direction of the second retaining wall 13 is orthogonal to the extending direction of the first retaining wall 12, so that two sides of the second retaining wall 13 respectively face to one of the dust filter holes 114.

Please refer to FIG. 3A, FIG. 3B, and FIG. 3C, the implementation of the cyclonic dust filter device 10 is described as follows. It is assumed that, at the initial stage, the trunk 11 receives an airflow to-be-filtered 50 from the air inlet end 113, and the airflow to-be-filtered 50 contains dust 40. The airflow to-be-filtered 50 displaces helically along a wall surface of the hollow flow channel 111 after entering the hollow flow channel 111, and simultaneously the dust 40 spirally flows in the hollow flow channel 111 along with the airflow to-be-filtered 50. When the airflow to-be-filtered 50 reaches a position of the dust filter hole 114, the dust 40 will be thrown out of the hollow flow channel 111 together with a portion of the airflow to-be-filtered 50 due to gravity of the dust 40; hereinafter, the portion of the airflow to-be-filtered 50 that is thrown out of the hollow flow channel 111 is defined as a centrifugal airflow 51. In addition, as shown in FIG. 5, a remaining portion of the airflow to-be-filtered 50 passes through the dust filter hole 114 directly since the dust 40 is not contained, and flows out from the air outlet end 112.

The centrifugal airflow 51 is angled relative to the airflow to-be-filtered 50 due to an influence of centrifugation. Moreover, since the first retaining wall 12 is not horizontal to the trunk 11, the first retaining wall 12 interferes with a traveling path of the centrifugal airflow 51 and forms one impact surface; hereinafter, the impact surface of the first retaining wall 12 is defined as a first impact zone 121. Further, after the centrifugal airflow 51 strikes the first retaining wall 12, the centrifugal airflow 51 is resisted by the first retaining wall 12 to change direction to be transformed into a first deflecting airflow 52. However, since the second retaining wall 13 is disposed orthogonally to the first retaining wall 12, and the second retaining wall 13 is located on a traveling path of the first deflecting airflow 52. Thus, the first deflecting airflow 52 strikes the second retaining wall 13 to form another impact surface; hereinafter, the impact surface of the second retaining wall 13 is defined as a second impact zone 131. Moreover, the first deflecting airflow 52 striking the second impact zone 131 causes the first deflecting airflow 52 to change direction of the traveling path and to be transformed into a second deflecting airflow 53. Since the second deflecting airflow 53 is subjected to multiple impacts, a flow velocity of the second deflecting airflow 53 will be decreased, and the dust 40 carried in the second deflecting airflow 53 will be separated from the second deflecting airflow 53 due to an influence of gravity of the dust 40. At this time, larger particles of the dust 40 as indicated by label "41" are affected by gravity and fall directly towards a direction away from the cyclonic dust filter device 10, and smaller particles of the dust 40 as indicated by label "42" are affected by centrifugation and are thrown out towards the direction away from the cyclonic dust filter device 10.

Figure 3A:
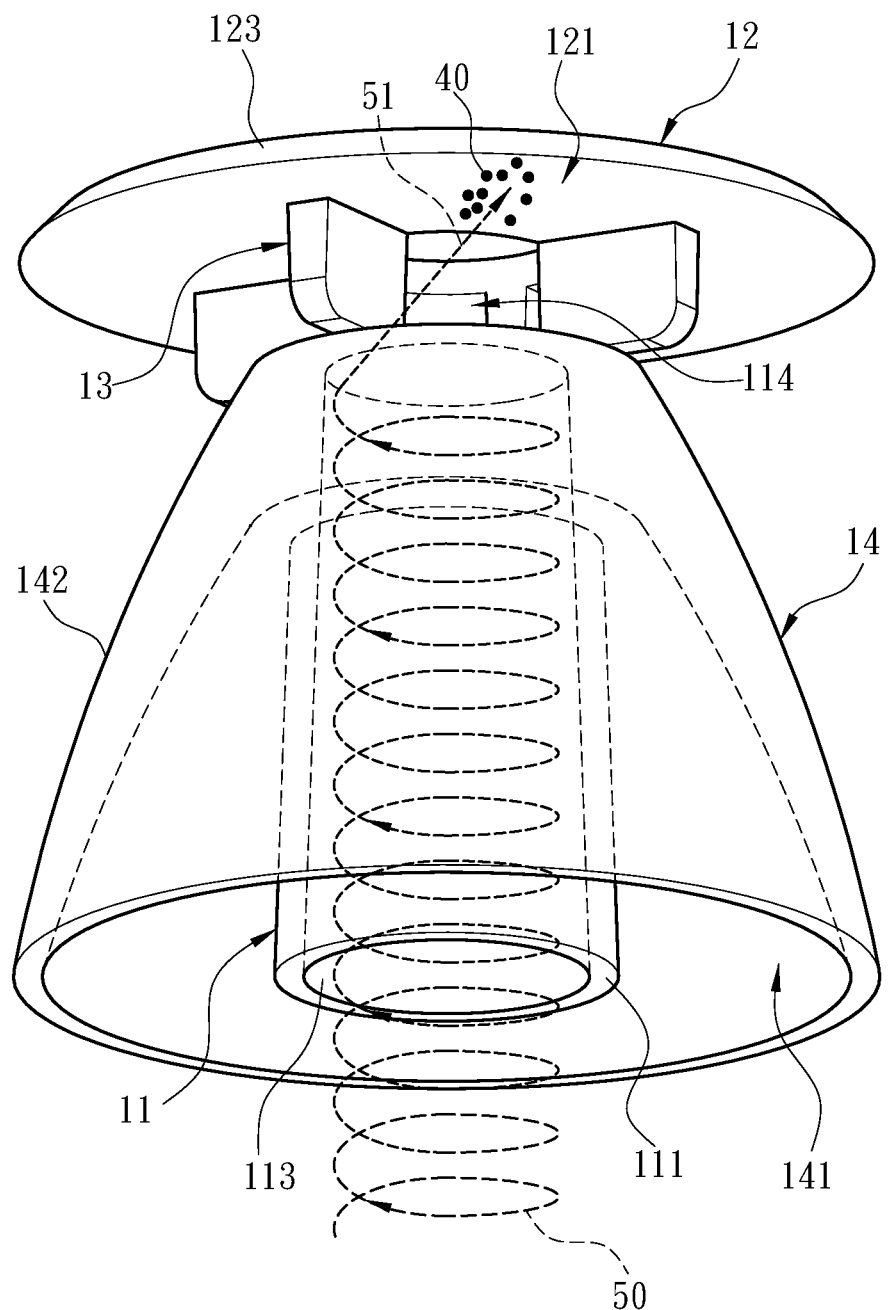
FIG. 3A is a schematic view of the implementation of a centrifugal airflow according to an embodiment of the cyclonic dust filter device of the present invention.
Figure 3B:
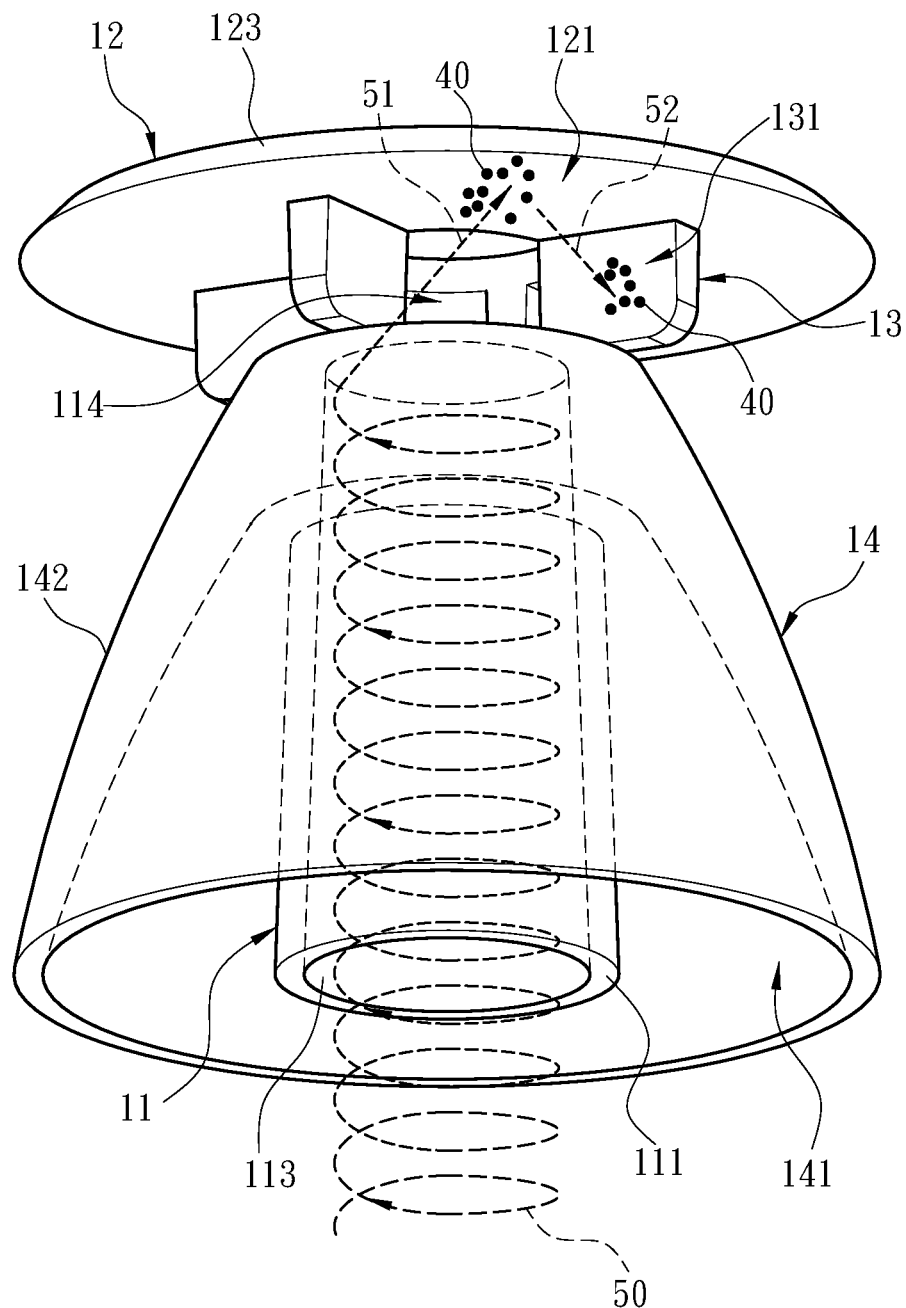
FIG. 3B is a schematic view of the implementation of a first deflecting airflow according to an embodiment of the cyclonic dust filter device of the present invention.
Figure 3C:
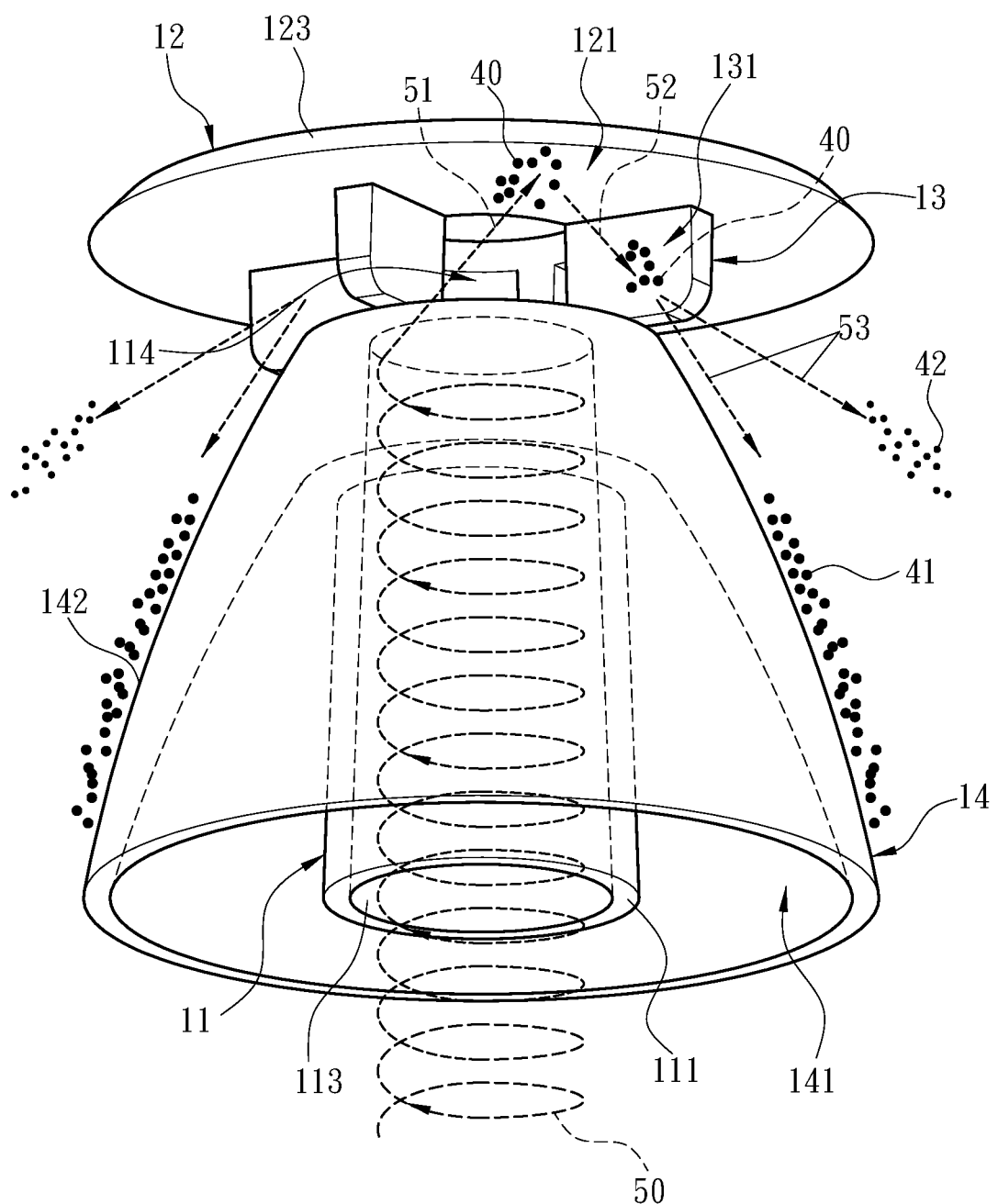
FIG. 3C is a schematic view of the implementation of a second deflecting airflow according to an embodiment of the cyclonic dust filter device of the present invention.
Figure 4:
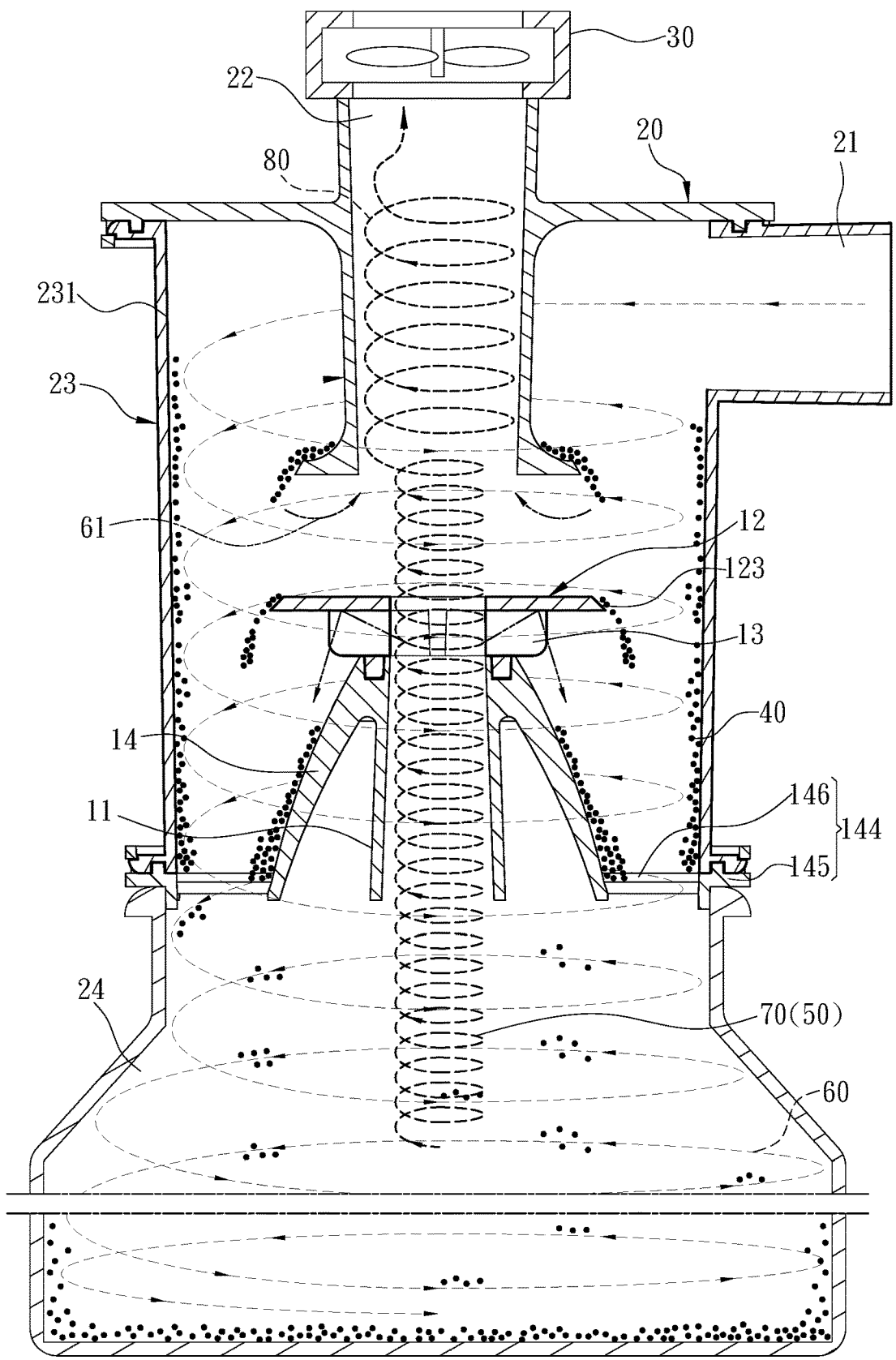
FIG. 4 is a schematic view of an embodiment of the cyclonic dust filter device of the present invention implemented in a dust filter equipment.
Figure 5:
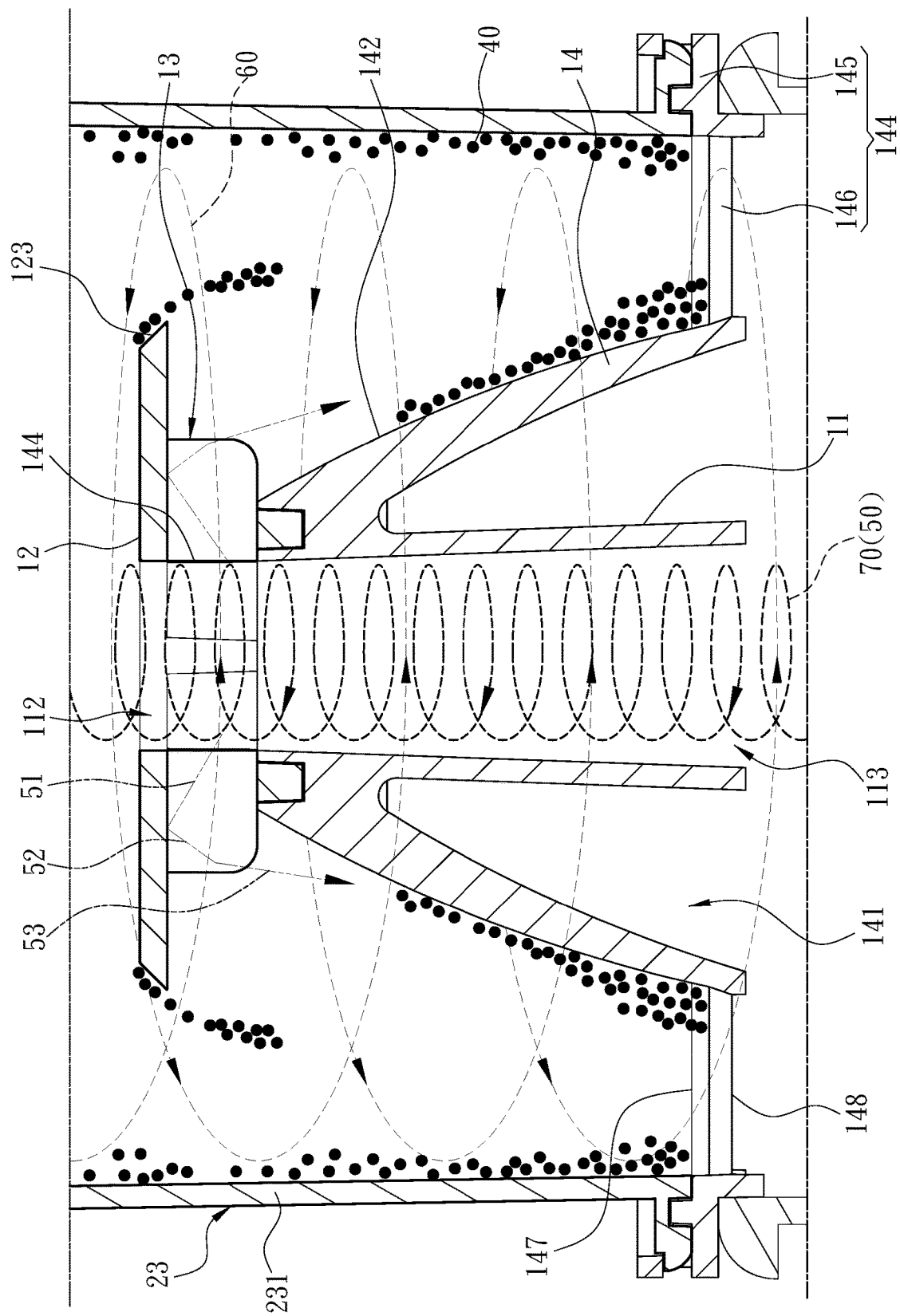
FIG. 5 is an enlarged schematic view of an embodiment of the cyclonic dust filter device of the present invention implemented in a dust filter equipment.

Please refer to FIG. 3C, FIG. 4 and FIG. 5, in the actual implementation, the present invention is installed in a dust filter equipment 20 and provides the function of multiple filtering for the dust filter equipment 20. Firstly, the basic structure of the dust filter equipment 20 is explained before explaining the specific implementation of the cyclonic dust filter device 10 of the present invention. The dust filter equipment 20 may be a cyclonic dust filter equipment, and the dust filter equipment 20 comprises an air inlet 21, an air outlet 22, a cyclone chamber 23 communicating with the air inlet 21 and the air outlet 22, and a dust collection chamber 24 communicating with the cyclone chamber 23 and disposed relative to the air inlet 21 and the air outlet 22. Further, the air outlet 22 is connected to an external air extractor 30. When the external air extractor 30 is activated, the cyclone chamber 23 is in a negative pressure state, so that an external air containing the dust 40 is sucked into the cyclone chamber 23 from the air inlet 21. After the external air enters the cyclone chamber 23, a first cyclone 60 and a second cyclone 70 are formed, and cyclonic directions of the first cyclone 60 and the second cyclone 70 are opposite. Further, the first cyclone 60 will settle downward into the dust collection chamber 24 after entering the cyclone chamber 23. Thus, the dust 40 carried in the first cyclone 60 will flow spirally along an annular side wall 231 of the cyclone chamber 23 due to the cyclonic centrifugal force, and the dust 40 will deposit in the dust collection chamber 24 due to gravity of the dust 40. Moreover, when the second cyclone 70 is formed, spiral airflow is also formed in the dust collection chamber 24 to bring out a portion of the dust 40, and the second cyclone 70 is defined as the airflow to-be-filtered 50 which is mentioned above. When the second cyclone 70 enters the air inlet end 113 of the hollow flow channel 111 to reach a position of the dust filter hole 114, a portion of the second cyclone 70 carried with the dust 40 is thrown outside of the hollow flow channel 111 by centrifugation, and is simultaneously transformed into the centrifugal airflow 51, and the remaining portion of the second cyclone 70 that does not contain the dust 40 continues to be displaced toward the direction of the air outlet end 112. Further, the centrifugal airflow 51 will strike on the first retaining wall 12 to be transformed into the first deflecting airflow 52, and then the first deflecting airflow 52 will strike the second retaining wall 13 to be transformed into the second deflecting airflow 53. At this time, a flow velocity of the second deflecting airflow 53 is decreased, so that larger particles of the dust 40 as indicated by label "41" are affected by gravity and fall into the dust collection chamber 24, and smaller particles of the dust 40 as indicated by label "42" are affected by centrifugation and are thrown out towards the direction away from the cyclonic dust filter device 10, and smaller particles of the dust 40 are mixed into the first cyclone 60 again. Thus, the second cyclone 70 becomes a secondary dust filtering cyclone of the dust filter equipment 20 and the function of multiple dust filtering is provided for the dust filter equipment 20.

Furthermore, after the second cyclone 70 is repeatedly filtered by the design of the dust filter hole 114 of the cyclonic dust filter device 10, the second cyclone 70 is a clean air when leaving the hollow flow channel 111. Also, the dust 40 in the first cyclone 60 is gathered on the annular side wall 231 by the cyclonic centrifugal force, comparatively, the first cyclone 60 at a central position is also a clean air. Moreover, since the first cyclone 60 and the second cyclone 70 are subjected to an action of the external air extractor 30, the first cyclone 60 at the central position as indicated by label "61" is combined with the second cyclone 70 to form a third cyclone 80. When the third cyclone 80 is discharged from the air outlet 22, the third cyclone 80 is a clean air of which the dust filtering effect is completed. Accordingly, when the present invention is installed in the dust filter equipment 20, the cyclonic dust filter device 10 provides the effect of multiple dust filtering for the dust filter equipment 20, so that the dust filter equipment 20 can obtain relatively cleaner air.

On the other hand, please refer to FIG. 1, FIG. 2, FIG. 3A, FIG. 3B, FIG. 3C and FIG. 4 again. In an embodiment, a diameter of the hollow flow channel 111 may be tapered from the air inlet end 113 to the air outlet end 112. Also, the first retaining wall 12 is formed with an opening 122 corresponding to a position of the air outlet end 112, so that the airflow to-be-filtered 50 which is cleaned is able to be discharged outside of the cyclonic dust filter device 10 from the opening 122 via the hollow flow channel 111. Further, the first retaining wall 12 extends outward from an end edge of the air outlet end 112 and may be configured as an annular structure. Moreover, in order to reduce an amount of the dust 40 remaining in the central position of the first cyclone 60 as indicated by label "61" to be mixed into the third cyclone 80, a guiding surface 123 is formed by an outer peripheral edge of the first retaining wall 12, thereby assisting the dust 40 to fall in the direction of the dust collection chamber 24.

In addition, the second retaining wall 13 is connected to a side of the first retaining wall 12 facing the trunk 11. Further, the second retaining wall 13 is formed by extending outwardly from a position of the trunk 11 corresponding to a hole edge of one side of the at least one dust filter hole 114, and two second retaining walls 13 which are adjacent are spaced apart from each other, so that the two second retaining walls 13 are respectively disposed on two sides of the dust filter hole 114. In addition, in an embodiment, a length of the second retaining wall 13 is smaller than a radius of the first retaining wall 12, so that when the cyclonic dust filter device 10 is viewed from a top view angle such as viewing angle in FIG. 1, the second retaining wall 13 is hidden by the first retaining wall 12. In addition, the first retaining wall 12, the second retaining wall 13, and the trunk 11 may be separate members. In an embodiment, the first retaining wall 12, the second retaining wall 13 and the trunk 11 may also be an integrally formed structure.

On the other hand, please refer to FIG. 3A, FIG. 3C and FIG. 4, in an embodiment, the cyclonic dust filter device 10 further comprises a deflector hood 14 connected to the trunk 11, and the deflector hood 14 is disposed at a remaining section from the dust filter hole 114 to the air inlet end 113. More specifically, a diameter of the deflector hood 14 is larger than a diameter of the trunk 11, and a diameter of one end of the deflector hood 14 facing the dust filter hole 114 is smaller than a diameter of another end of the deflector hood 14 facing the air inlet end 113. Thus, the deflector hood 14 is shaped into an umbrella structure, and a space 141 is formed between the deflector hood 14 and the trunk 11. Moreover, an outer side surface of the deflector hood 14 is a guiding arcuate surface 142, when the large particles 41 of the dust 40 carried in the second deflecting airflow 53 are separated from the second deflecting airflow 53 due to the influence of gravity, the large particles 41 of the dust 40 will slide down along the guiding arcuate surface 142 and fall into the dust collection chamber 24.

Figure 6:
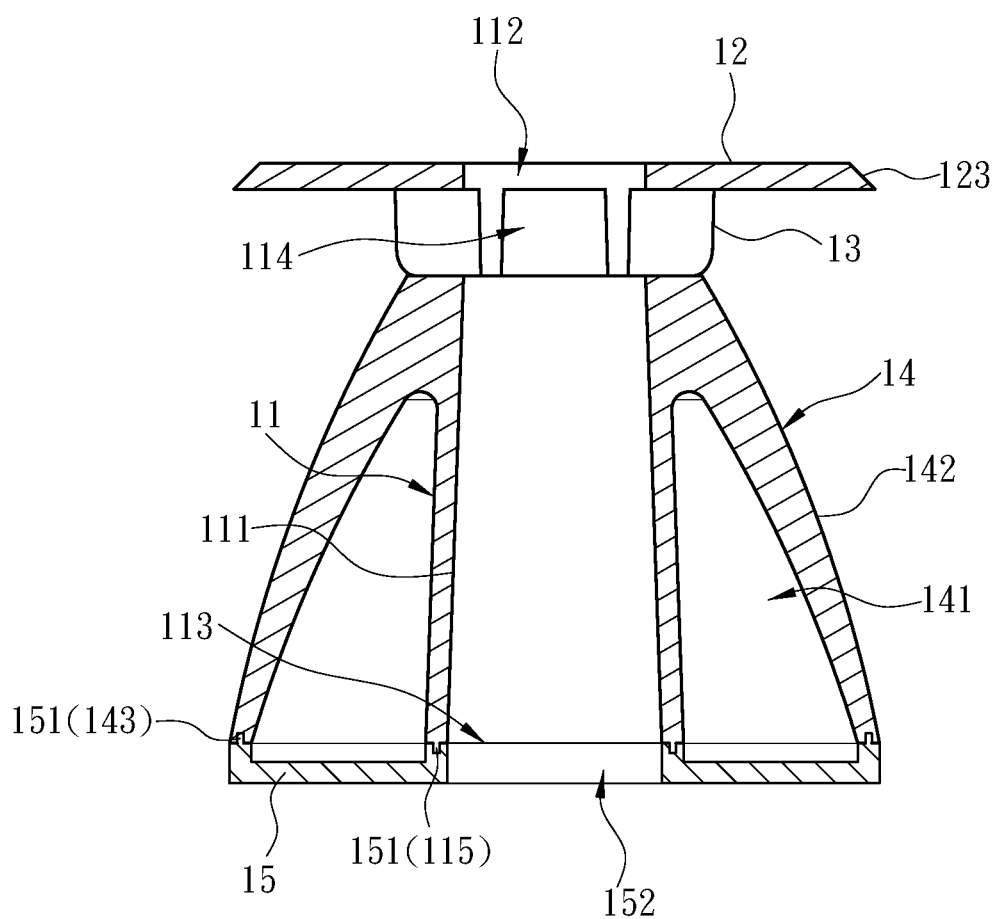
FIG. 6 is a cross-sectional view of the structure of an embodiment of the cyclonic dust filter device of the present invention.

Please refer to FIG. 4 and FIG. 6, in an embodiment, in order to prevent the dust 40 from entering into the space 141, the cyclonic dust filter device 10 may further be provided with a cover 15 that is respectively assembled with the trunk 11 and the deflector hood 14 so that the cover 15 seals the space 141. Specifically, the cover 15 comprises a first assembly structure 151, and the trunk 11 and the deflector hood 14 respectively include a second assembly structure 115 (143) disposed correspondingly to the first assembly structure 151. By assembling the first assembly structure 151 with one of the second assembly structures 115 (143), the cover 15 is assembled on the trunk 11 and the deflector hood 14. In addition, in the embodiment, the first assembly structure 151 may be an assembly block or an assembly slot, and the second assembly structures 115 (143) may be the assembly slot or the assembly block. Thus, by assembling the assembly block in the assembly slot, the trunk 11 and the deflector hood 14 are respectively connected to the cover 15. Further, the second assembly structure 115 of the trunk 11 and the second assembly structure 143 of the deflector hood 14 may be in different shapes and forms, as shown in FIG. 6. Furthermore, after the cover 15 is assembled on the trunk 11 and the deflector hood 14, the cover 15 comprises a through hole 152 disposed correspondingly to the air inlet end 113 in order to allow the second cyclone 70 to enter into the hollow flow channel 111. As the cover 15 is assembled on the trunk 11, the through hole 152 communicates with the hollow flow channel 111, so that the second cyclone 70 is able to flow into the hollow flow channel 111 through the through hole 152.

Figure 7:
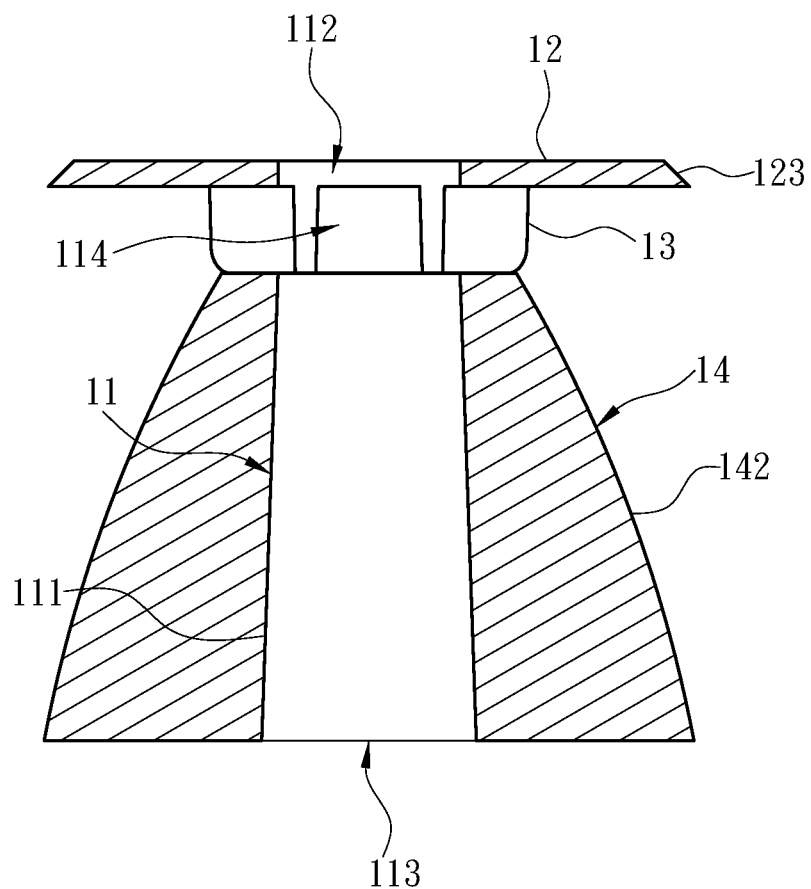
FIG. 7 is a cross-sectional view of the structure of an embodiment of the cyclonic dust filter device of the present invention.

In another implementation, please refer to FIG. 5, FIG. 6, and FIG. 7, the deflector hood 14 and the trunk 11 may also be an integrally formed structure, that is, the deflector hood 14 and the trunk 11 are a solid structure without the space 141. When the second cyclone 70 is contacted with the solid structure, the second cyclone 70 will be blocked from flowing into the hollow flow channel 111. Only when the second cyclone 70 does not contact the deflector hood 14 and the trunk 11, that is, the second cyclone 70 is not blocked, the second cyclone 70 enables of entering into the hollow flow channel 111.

Figure 8:
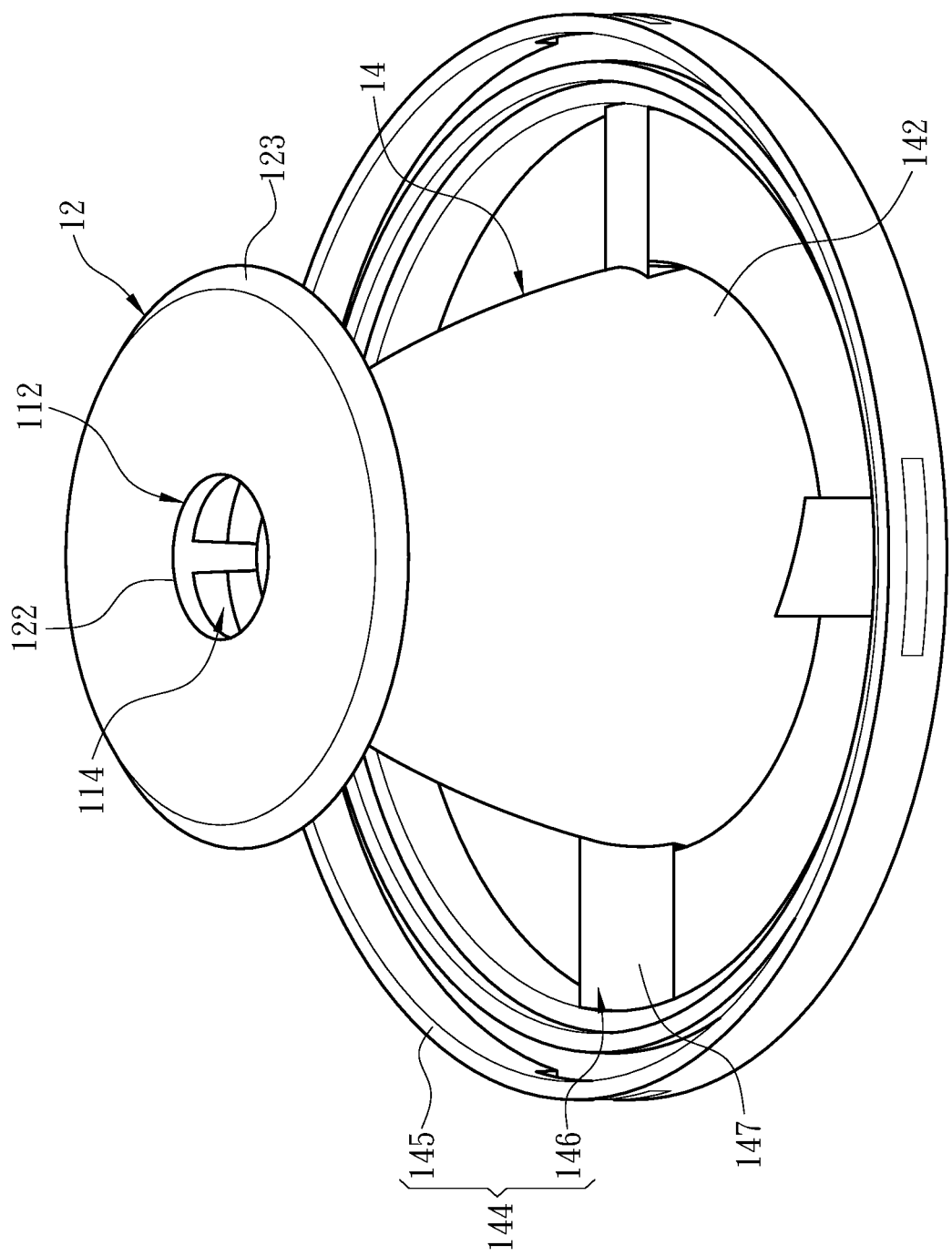
FIG. 8 is a perspective view of the structure of an embodiment of the cyclonic dust filter device of the present invention.

Further, please refer to FIG. 4, FIG. 5 and FIG. 8, in order to install the deflector hood 14 in the cyclonic dust filter device 10, the deflector hood 14 may further be provided with a fixing bracket 144. The fixing bracket 144 comprises an annular mounting member 145 connecting the cyclone chamber 23 and the dust collection chamber 24, and a plurality of support ribs 146 connecting the annular mounting member 145 and connected to the deflector hood 14. The plurality of support ribs 146 are spaced apart, and any two of the plurality of support ribs 146 comprise a region for allowing air to flow, and the plurality of support ribs 146 allow the cyclonic dust filter device 10 to be disposed at a center position of the cyclone chamber 23. Further, each of the plurality of support ribs 146 comprises a windward end 147 and a wind outlet end 148 along a flow direction of the first cyclone 60. Each of the plurality of support ribs 146 is disposed obliquely, and the windward end 147 is higher than the wind outlet end 148. More specifically, in the present embodiment, each of the plurality of support ribs 146 comprises a function of guiding the first cyclone 60 in addition to supporting the cyclonic dust filter device 10, and an inclination direction of each of the plurality of support ribs 146 is set along the flow direction of the first cyclone 60. When the first cyclone 60 is contacted with the windward end 147, the first cyclone 60 will follow the guiding of one of the plurality of support ribs 146 to flow toward the dust collection chamber 24. Finally, the first cyclone 60 leaves the one of the plurality of support ribs 146 which is mentioned above from the wind outlet end 148. Accordingly, each of the plurality of support ribs 146 enable of reducing the resistance to the first cyclone 60 during the implementation of the present invention.

What is claimed is:

1. A cyclonic dust filter equipment, comprising:
a cyclone chamber, comprising an air inlet provided for a gas-to-be-filtered which contains a dust to enter, an annular side wall connected to the air inlet, and an air outlet, wherein the air inlet and the air outlet are located at one side of the cyclone chamber, and the annular side wall guides the gas to-be-filtered to flow spirally to form a first cyclone;

a dust collection chamber, disposed at another side of the cyclone chamber without the air inlet and the air outlet, and communicated with the cyclone chamber to receive the first cyclone, the dust collection chamber comprising a bottom wall that forces a flow direction of the first cyclone to be changed oppositely to form a second cyclone; and a dust filter device, disposed in the cyclone chamber, comprising:

a trunk, comprising a hollow flow channel as well as an air inlet end and an air outlet end respectively located at two ends of the hollow flow channel, the trunk provided with at least one dust filter hole communicating with the hollow flow channel, the trunk receiving the second cyclone from the air inlet end and discharging from the air outlet end, wherein a wall surface of the hollow flow channel guides the second cyclone to displace helically to discharge a centrifugal airflow containing the dust from the dust filter hole to an outside of the trunk;

at least one first retaining wall, the first retaining wall disposed at the air outlet end of the trunk and located on a traveling path of the centrifugal airflow, and a first impact zone is defined by the at least one first retaining wall for the centrifugal airflow striking to the first retaining wall and changing a direction of the centrifugal airflow to form a first deflecting airflow; and at least one second retaining wall, the second retaining wall disposed at the air outlet end of the trunk and located on a traveling path of the first deflecting airflow, and a second impact zone is defined by the second retaining wall for the first deflecting airflow striking to the second retaining wall and changing a direction of the first deflecting airflow to form at least one second deflecting airflow.

2. The cyclonic dust filter device as claimed in claim 1, wherein the dust filter hole is disposed at a position of an end edge of the air outlet end.

3. The cyclonic dust filter device as claimed in claim 2, wherein the first retaining wall is formed by extending outwardly from the end edge of the air outlet end of the trunk.

4. The cyclonic dust filter device as claimed in claim 3, wherein the second retaining wall is extended outwardly from the trunk at one side of the dust filter hole.

5. The cyclonic dust filter device as claimed in claim 4, wherein the trunk is provided with a deflector hood at a remaining section from the dust filter hole to the air inlet end, and a diameter of the deflector hood is larger than a diameter of the trunk.

6. The cyclonic dust filter device as claimed in claim 5, wherein a cover is disposed between the deflector hood and the trunk, and the cover comprises a through hole corresponding to the air inlet end.

7. The cyclonic dust filter device as claimed in claim 5, wherein an outer side surface of the deflector hood is a guiding arcuate surface.

8. The cyclonic dust filter device as claimed in claim 5, wherein the deflector hood is provided with a fixing bracket.

9. The cyclonic dust filter device as claimed in claim 1, wherein a diameter of the hollow flow channel is tapered from the air inlet end to the air outlet end.

* * * * *